Feb. 22, 1938. F. BOEHLE 2,109,162
PISTON VALVE WITH MID POSITION BYPASS
Filed Feb. 15, 1935 3 Sheets-Sheet 1

Inventor
FRIEDEL BOEHLE,
By Toulmin & Toulmin
Attorneys

Feb. 22, 1938. F. BOEHLE 2,109,162
PISTON VALVE WITH MID POSITION BYPASS
Filed Feb. 15, 1935 3 Sheets-Sheet 2
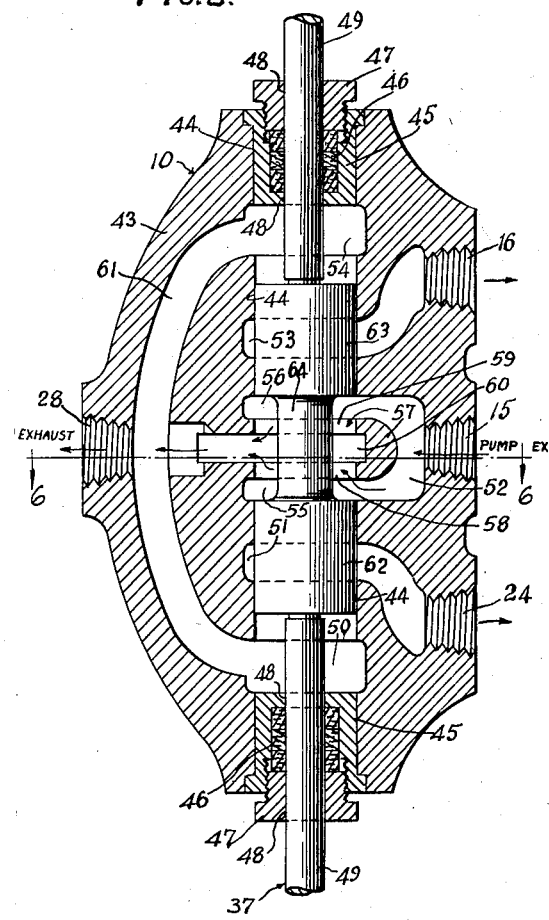
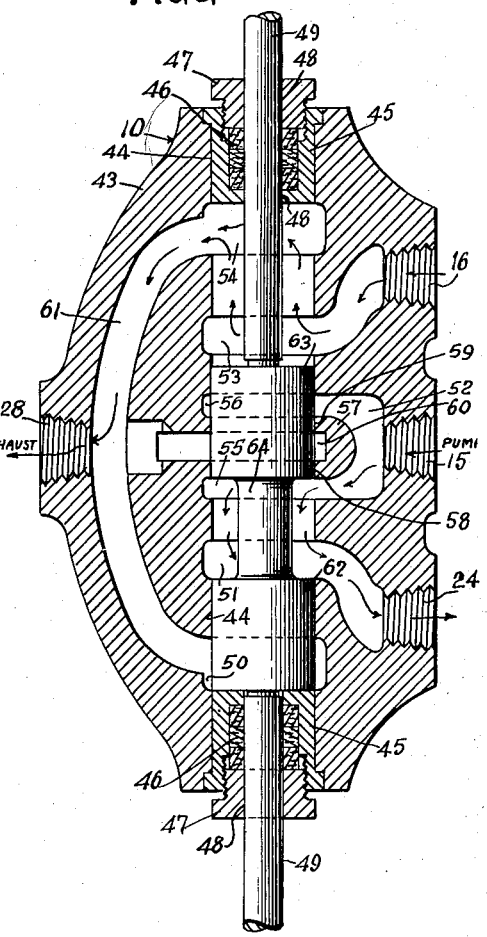
Inventor
FRIEDEL BOEHLE,
BY Toulmin & Toulmin
Attorneys

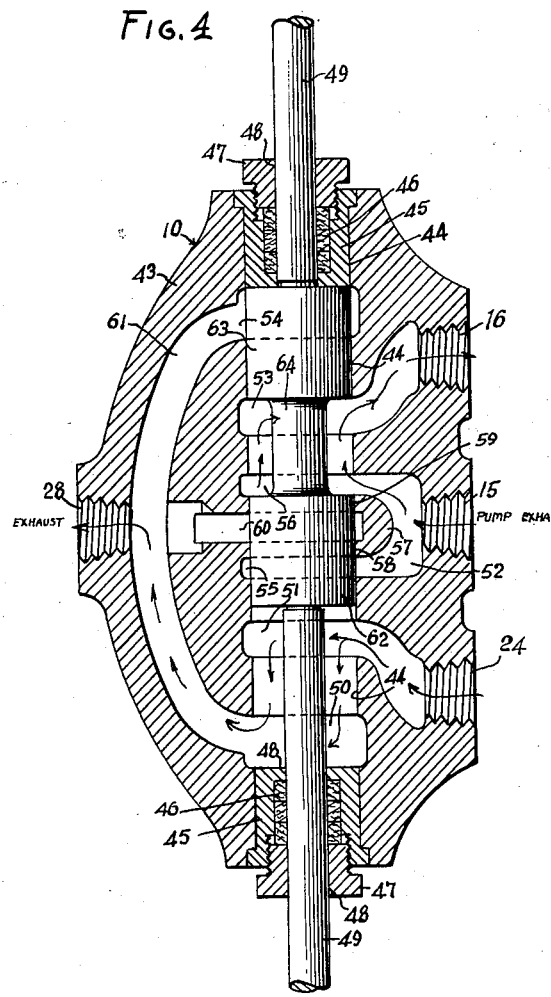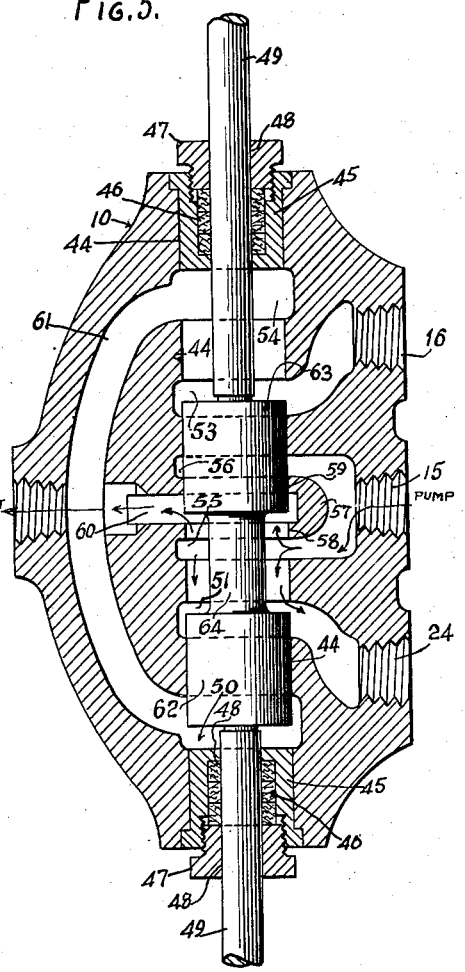

Patented Feb. 22, 1938

2,109,162

UNITED STATES PATENT OFFICE 2,109,162

PISTON VALVE WITH MID-POSITION BYPASS

Friedel Boehle, Mount Gilead, Ohio, assignor to The Hydraulic Press Corporation, Inc., Wilmington, Del., a corporation of Delaware Application February 15, 1935, Serial No. 6,650

10 Claims. (Cl. 60—52)

This invention relates to hydraulic machinery, and in particular to valves for controlling the operation of such machinery.

One object of my invention is to provide a piston type valve having spaced heads, and a mid-position by-pass arrangement.

Another object is to provide a piston type valve having at least four operating positions, one of which positions provides a by-passing of the pump, together with a throttling effect maintaining a slight back pressure in the return side of the press sufficient to counterbalance the weight of the plunger and hold the platen in a position of rest.

Another object is to provide a valve for controlling hydraulic machinery, said valve consisting of a pair of spaced heads reciprocating in a bore having a plurality of chambers, this bore being provided with a central by-pass member so arranged that a slight motion of one of the heads will close one side of the by-pass to permit the other side to be opened to pressure from the pump.

Another object is to provide a piston type valve having a casing with a cylindrical bore, and a plurality of spaced chambers, and a valve plunger with a plurality of spaced solid heads, reciprocable in this bore, the casing having in the mid-position of the bore a central member arranged to pass fluid from either side or both, according to the respective positions of the valve heads.

Another object is to provide a piston type valve of the kind just described, wherein both of the cylinder connections may be closed off simultaneously while the pump is allowed to by-pass freely through the central by-pass member of the valve.

Another object is to provide a hydraulic circuit containing a four-position piston type valve and a press controlled thereby, this valve having a central by-pass member so arranged that in one position it by-passes the major portion of the pump discharge into the exhaust line but by a throttling effect maintains sufficient pressure on the return side of the plunger to counterbalance the weight of the moving parts, and maintain the plunger in a position of rest.

Referring to the drawings:

Figure 2 is a central longitudinal section through the valve of my invention, showing the valve in its neutral or complete by-passing position.

Figure 3 is a view similar to Figure 2, but with the valve in a position to cause a return stroke of the press plunger.

Figure 4 is a view similar to Figures 2 and 3, but with the valve in a position to cause the press plunger to make a forward stroke.

Figure 5 is a view similar to Figures 2, 3, and 4, but with the valve in the partial by-passing position so that the pump discharge is by-passed, but a throttling effect is produced which maintains a sufficient pressure in the return side of the press cylinder to counterbalance the weight of the plunger and maintain it in a position of rest.

Hydraulic circuit for valve

Figure 1:
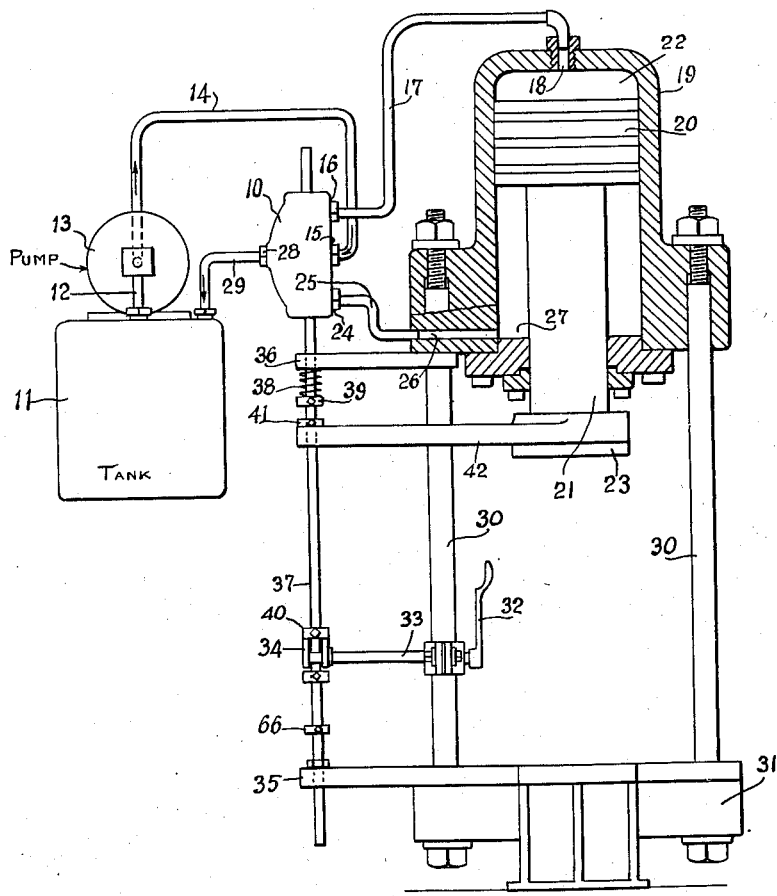
Figure 1 is a diagrammatic side elevation, partly in section, of a typical hydraulic circuit, in which the valve of my invention may be used.
Figure 6:
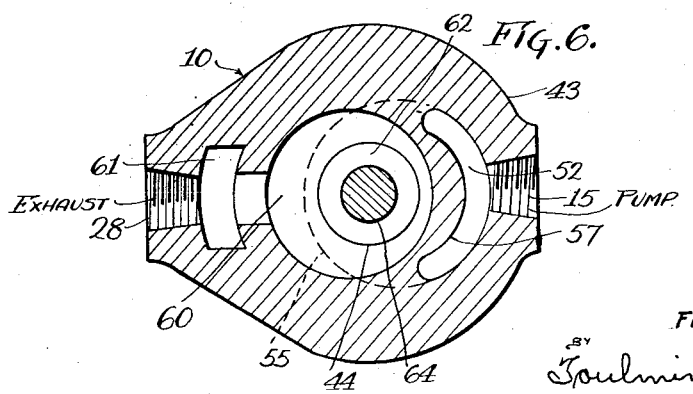
Figure 6 is a cross section taken along the line 6—6 in Figure 2.

Referring to the drawings in detail, Figure 1 shows a circuit chosen for purposes of exemplification only, in which the valve of my invention, generally designated 10, may be employed. In this circuit is also shown a fluid tank 11, from which the pipe line 12 runs to the suction side of the pump 13, from the discharge side of which the pressure pipe 14 communicates with the central port 15 of the valve 10.

From the upper port 16 of the valve 10 the pipe line 17 runs to the entrance port 18 of the press cylinder 19, above the piston head 20 of the press plunger 21. The port 18 opens into the chamber 22, the admission of pressure fluid to which causes the press plunger 21 to move downward and make a working stroke. A platen 23 is attached to the lower end of the plunger 21.

From the lower port 24 of the valve 10 the pipe line 25 runs to the port 26, opening into the chamber 27 beneath the piston head 20, the admission of pressure to which causes the plunger 21 to execute a return stroke. From the central port 28 on the opposite side of the valve 10 from the ports 15, 16 and 24 the exhaust pipe line 29 runs back to the fluid tank 11. The ports 16 and 24 thus act as service ports for the transmission of fluid to and from the hydraulic machine to which the valve 10 is connected.

The cylinder 19 of the press is connected by the strain rods 30 to the bed plate 31 of the press. Mounted on the frame thus constructed, as on one of the strain rods 30, is the operating lever 32 having the operating shaft 33, terminating in a yoked crank portion 34. The frame of the press is provided with extension arms 35 and 36, having bores through which passes the valve control rod 37, the latter also passing between the arms of the yoked crank portion 34.

A spring 38, engaging a collar 39 fixed on the valve control rod 37, urges the latter into a downward position, the opposite end of the spring 38 engaging the frame arm 36. A second fixed collar 40 on the valve control rod 37 is adjustably arranged to be engaged by the yoked crank portion 34 and be moved up or down thereby, according to the motion given the control lever 32 through the operating shaft 33.

The valve control rod 37 also carries a fixed collar 41 adapted to be engaged by an arm 42 extending laterally from the platen 23 when the platen reaches a predetermined point in its upward or return stroke. This motion causes the valve control rod 37 to move upward, carrying with it the internal members of the valve 10, as will subsequently appear. Another adjustable collar 66 on the lower end of the valve control rod 37 limits the downward movement of the latter by engaging the frame arm 35.

The positions of the collars 39, 40, 41, and 66 may be adjusted along the rod 37 by loosening the set screws thereof in order to provide for the proper timing of the valve.

Valve construction

The valve 10 of my invention (Figures 2 to 5, inclusive), consists of a casing 43 having a longitudinal bore 44 therethrough, the ends of which are closed by the plugs 45, the plugs having the packings 46 and glands 47 for tightening the same. A bore 48 through each plug 45 and gland 47 serves to permit the reciprocation of the valve rod 49, the latter being, in effect, a continuation of the valve control rod 37 (Figure 1). Leakage between the valve rod 49 and the bore 48 is prevented by the packing 46, previously described.

The valve bore 44 is provided with chambers 50, 51, 52, 53, and 54, arranged successively along the bore 44. The central chamber 52 is further subdivided into the sub-chambers 55 and 56, respectively, by the mid-position by-pass member 57. The latter is of annular construction, with passages 58 and 59 opening into a central chamber 60 thereof from the sub-chambers 55 and 56, respectively. The chambers 60, 50, and 54 open into the exhaust manifold 61 of the casing 43, the discharge thereof passing outward through the exhaust port 28 by way of the pipe line 29 to the tank 11. The chambers 51 and 53, however, communicate with the lower and upper ports 24 and 16, respectively, of the valve casing 43. Finally, the central chamber 52 opens into the pressure port 15 connected by the pipe line 14 to the pressure side of the pump 13.

The valve rod 49 is provided with spaced heads 62 and 63, respectively, these being of such length as to cover and uncover the various chambers in the manner described below, according to the motion of the valve rod and the valve control rod 37. The spaced heads 62 and 63 are connected by the neck 64, which forms, in effect, a slightly enlarged portion of the valve rod 49.

Operation

The operation of the valve of my invention is best described in connection with a typical circuit, such as the hydraulic press circuit shown in Figure 1. It will be understood, however, that this circuit is diagrammatic and that other circuits may be substituted without departing from the spirit of my invention as expressed in the appended claims.

To start the press in operation, in order to perform a working stroke, the control lever 32 is manipulated so as to raise the valve control rod 37 to its uppermost position against the urge of the spring 38 (Figure 1). At the same time the spaced heads 62 and 63 move upward to the uppermost positions shown in Figure 4. When the heads are in this position the pressure discharge of the pump passes along the pipe 14, through the port 15, into the central chamber 52, thence through the sub-chamber 56, the chamber 53, the port 16, the pipe line 17 and the port 18 into the chamber 22 of the press cylinder 19 above the piston head 20 thereof. This causes the piston head 20 and the plunger 21 to move downward, executing a pressing stroke with the platen 23.

The platen 23 moves downward until it encounters the work and completes its working stroke. The working stroke may be terminated in any desired manner, either manually by manipulating the hand lever 32, by a pressure-responsive reversal, or by positionally-responsive means, such as electrical switches or stops on the valve rod 37. These devices are well known to those skilled in the art, and require no further description. For present purposes it will be assumed that the manual operation is followed.

Accordingly, when the platen has proceeded downward to the desired extent, the hand lever 32 is released. This releases the collar 40 so that the valve control rod 37 is urged down by the spring 38 into its lowermost position (Figure 3). In this position the spaced heads 62 and 63 also come to rest in their lowermost positions, permitting the discharge of the pump to pass from the central chamber 52 by way of the sub-chamber 55, the chamber 51, the port 24, the pipe line 25 and the port 26 into the chamber 27 beneath the piston head 20 of the press cylinder 19, lifting the plunger 21 and causing a return stroke of the platen 23 to occur.

The platen 23 continues to move upward in this manner until the end of the platen arm 42 engages the collar 41, lifting the valve control rod 37, and with it the valve heads 62 and 63 into the partial by-pass position shown in Figure 5. In this position the valve heads 62 and 63 occupy a slightly higher position than in the return position shown in Figure 3.

In the partial by-pass position (Figure 5), the discharge from the pump passes from the chamber 52, through the sub-chamber 55 and the central by-pass chamber 60 into the exhaust manifold 61, thence by way of the exhaust port 28 and the exhaust line 29 to the tank 11. The throttling effect between the edges of the valve piston head 63 and the central by-pass chamber 60 causes a back pressure to be set up which is transmitted backward through the sub-chamber 55, the chamber 51, the port 24, the pipe line 25 and the port 26 into the chamber 27 below the piston head 20. The positions of the collars 39 and 40, as well as 41 are adjusted until the back pressure passing into the return chamber 27 is sufficient to sustain the weight of the piston 20 and its associated moving parts in a position of rest.

If it is desired to maintain the platen in a position where the pressure is retained upon the work the valve heads 62 and 63 may be moved into the full by-pass position shown in Figure 2. In this position the fluid on both the return side 27 and the forward side 22 of the piston 20 is entirely cut off from the valve so that the piston 20 remains immovable and with it the platen 23. The full discharge of the pump then passes through the port 15, the central chamber 52, the sub-chambers 55 and 56, the central by-pass chamber 60, the exhaust manifold 61, the exhaust port 28 and the exhaust line 29, into the fluid tank 11. In this position no fluid is allowed to enter or leave either side of the cylinder 19 so that the piston 20 and platen 23 remain immovable. This position is obtained by a suitable manipulation of the hand lever 32.

It will be obvious that the valve heads 62 and 63 may be raised into a second partial by-pass position having a similar effect to the position shown in Figure 5. In this second partial by-pass position, however, the valve heads 62 and 63 will be located at approximately the same distances below the upper end of the valve chamber as they are above the bottom shown in Figure 5.

Thus it will be seen that I have provided a valve which is capable of operation in five different positions, four of which have been completely disclosed above. It will be furthermore apparent from the foregoing that the valve in its central position may assume a complete by-passing position, allowing none of the fluid to enter or leave either side of the cylinder, or other hydraulic machine controlled thereby. It will be furthermore apparent that the valve may be caused to assume a partial by-pass position so that the pump discharge will be by-passed, but a back pressure produced by a throttling effect sufficient to maintain the press plunger in a state of rest without exerting any force upon the workpiece, such as at the end of the return stroke.

It will be further understood that in place of the double-acting piston shown I may employ a single-acting pressing plunger with pull-back plungers, these being connected to the valve in a similar manner.

I desire to comprehend within my invention such modifications as may be embraced within my claims and the scope of my invention.

Having thus fully described my invention, what I claim as new and desire to secure by Letters Patent, is:

1. A valve for controlling hydraulic circuits comprising a casing having a bore with a plurality of chambers, said casing having an inlet and an outlet and a pair of service ports communicating with said chambers, and a valve rod with spaced heads reciprocable in said bore, one of said chambers being centrally located in said casing, said casing having a bored projecting portion extending into said central chamber, said valve rod and said heads being adapted in one position to cut off communication simultaneously between said inlet and said service ports while by-passing the fluid from said inlet to said outlet through said central chamber past said projecting portion.

2. A valve for controlling hydraulic circuits comprising a casing having a bore with a plurality of chambers, said casing having an inlet and an outlet and a pair of service ports communicating with said chambers, and a valve rod with spaced heads reciprocable in said bore, one of said chambers being centrally located in said casing, said casing having a bored projecting portion extending into said central chamber, said bored projecting portion being arranged to subdivide said central chamber into a plurality of sub-chambers, said valve rod and said heads being adapted in one position to cut off communication simultaneously between said inlet and said service ports while by-passing the fluid from said inlet to said outlet through said central chamber past said projecting portion.

3. A valve for controlling hydraulic circuits comprising a casing having a bore with a plurality of chambers, said casing having an inlet and an outlet and a pair of service ports communicating with said chambers, and a valve rod with spaced heads reciprocable in said bore, one of said chambers being centrally located in said casing, said casing having a bored projecting portion extending into said central chamber, said bored projecting portion being arranged to subdivide said central chamber into a central sub-chamber and side sub-chambers communicating therewith, said valve rod and said heads being adapted in one position to cut off communication simultaneously between said inlet and said service ports while by-passing the fluid from said inlet to said outlet through said central chamber past said projecting portion.

4. A valve for controlling hydraulic circuits comprising a casing having a bore, said bore being divided into a central chamber and end chambers with intermediate chambers therebetween, said casing having an inlet and an outlet and a pair of service ports communicating with said chambers, and a valve rod with spaced heads reciprocable in said bore, said casing having a bored projecting portion extending into said central chamber, said valve rod and said heads being adapted in one position to cut off communication simultaneously between said inlet and said service ports while by-passing the fluid from said inlet to said outlet through said central chamber past said projecting portion.

5. A valve for controlling hydraulic circuits comprising a casing having a bore, said bore being divided into a central chamber and end chambers with intermediate chambers therebetween, said casing having an inlet and an outlet and a pair of service ports communicating with said chambers, and a valve rod with spaced heads reciprocable in said bore, said casing having a bored projecting portion extending into said central chamber, said bored projecting portion being arranged to subdivide said central chamber into a plurality of sub-chambers, said valve rod and said heads being adapted in one position to cut off communication simultaneously between said inlet and said service ports while by-passing the fluid from said inlet to said outlet through said central chamber past said projecting portion.

6. A valve for controlling hydraulic circuits comprising a casing having a bore, said bore being divided into a central chamber and end chambers with intermediate chambers therebetween, said casing having an inlet and an outlet and a pair of service ports communicating with said chambers, and a valve rod with spaced heads reciprocable in said bore, said casing having a bored projecting portion extending into said central chamber, said bored projecting portion being arranged to subdivide said central chamber into a central sub-chamber and side sub-chambers communicating therewith, said valve rod and said heads being adapted in one position to cut off communication simultaneously between said inlet and said service ports while by-passing the fluid from said inlet to said outlet through said central chamber past said projecting portion.

7. A valve for controlling hydraulic circuits comprising a casing having a bore, said bore having a central chamber, another chamber on each side of said central chamber in spaced relationship therewith, said central chamber having a bored projecting portion of said casing extending therein, said casing having an inlet and an outlet and a pair of service ports communicating with said chambers, and a valve rod with spaced heads reciprocable in said bore and through said bored projecting portion, said valve rod and said heads being adapted in one position to cut off communication simultaneously between said inlet and said service ports while by-passing the fluid from said inlet to said outlet through said central chamber past said projecting portion.

8. A hydraulically-operated machine system comprising a plunger, a cylinder therefor having hydraulic connections opening from opposite sides of said plunger, a source of pressure fluid, a valve with a valve casing arranged to control the supply of pressure fluid from said source to said cylinder, said valve casing having a bore with a central chamber, and intermediate chambers in spaced relationship on either side thereof, said casing having an inlet and an outlet and a pair of service ports communicating with said chambers, said central chamber having a bored projecting portion of said casing extending thereinto, said valve having a valve rod with spaced heads reciprocable in said bore, and mechanism connecting said plunger and said valve rod, said valve rod and heads being adapted in one position to cut off communication simultaneously between said intermediate chambers and said central chamber while by-passing the discharge from said inlet through said central chamber past said projecting portion into said outlet.

9. A hydraulically-operated machine system comprising a plunger, a cylinder therefor having hydraulic connections opening from opposite sides of said plunger, a source of pressure fluid, a valve with a valve casing arranged to control the supply of pressure fluid from said source to said cylinder, said valve casing having a bore divided into a central chamber and end chambers with intermediate chambers therebetween, said casing having an inlet and an outlet and a pair of service ports communicating with said chambers, said central chamber having a bored projecting portion of said casing extending therein, said valve having a valve rod with spaced heads reciprocable in said bore, and mechanism interconnecting said plunger and said valve rod, said valve rod and heads being adapted in one position to cut off communication simultaneously between said intermediate chambers and said central chamber while by-passing the discharge from said inlet through said central chamber past said projecting portion into said outlet.

10. A hydraulically-operated machine system comprising a plunger, a cylinder therefor having hydraulic connections opening from opposite sides of said plunger, a source of pressure fluid, a valve with a valve casing arranged to control the supply of pressure fluid from said source to said cylinder, said valve casing having a bore divided into a central chamber and end chambers with intermediate chambers therebetween, said casing having an inlet and an outlet and a pair of service ports communicating with said chambers, said central chamber having a bored projecting portion of said casing extending therein, said valve having a valve rod with spaced heads reciprocable in said bore, and mechanism interconnecting said plunger and said valve rod, said valve rod and heads being adapted in one position to cut off communication simultaneously between said intermediate chambers and said central chamber while by-passing the discharge from said inlet through said central chamber past said projecting portion into said outlet, said bored projecting portion being arranged to subdivide said central chamber into a central sub-chamber and side sub-chambers.

FRIEDEL BOEHLE.